US007687001B2

(12) United States Patent
Sato et al.

(10) Patent No.: US 7,687,001 B2
(45) Date of Patent: Mar. 30, 2010

(54) METHOD OF MANUFACTURING SPEAKER EDGE MEMBER

(75) Inventors: Seiya Sato, Yamagata (JP); Kyoichi Matsuda, Yamagata (JP)

(73) Assignees: Pioneer Corporation, Tokyo (JP); Tohoku Pioneer Corporation, Yamagata (JP)

( * ) Notice: Subject to any disclaimer, the term of this patent is extended or adjusted under 35 U.S.C. 154(b) by 530 days.

(21) Appl. No.: 11/643,798

(22) Filed: Dec. 22, 2006

(65) Prior Publication Data

US 2007/0145637 A1 Jun. 28, 2007

(30) Foreign Application Priority Data

Dec. 26, 2005 (JP) ............................ 2005-373232

(51) Int. Cl.
*B29C 45/14* (2006.01)

(52) U.S. Cl. .................................... 264/259; 264/271.1

(58) Field of Classification Search .................. 264/259
See application file for complete search history.

(56) References Cited

U.S. PATENT DOCUMENTS

2003/0008134 A1* 1/2003 Murar et al. ................ 428/332
2003/0188919 A1* 10/2003 Suzuki et al. ............... 181/171

FOREIGN PATENT DOCUMENTS

JP 2003-111189 A 4/2003
JP 2004-007357 A 1/2004

* cited by examiner

*Primary Examiner*—Kat Wyrozebski
*Assistant Examiner*—Xue Liu
(74) *Attorney, Agent, or Firm*—Arent Fox LLP

(57) ABSTRACT

It is an object of the present invention to improve a speaker edge member manufacturing method in which a substrate is introduced into an edge member molding material by virtue of insertion molding, to prevent a trouble such as a crack on a parting line or the like, thus shortening a manufacturing time and thus reducing a manufacturing cost. The method comprises the steps of: attaching the substrate into the edge member molding die; introducing the edge member formation material into the edge member molding die before or after attaching the substrate into the edge member molding die; heating/pressurizing the substrate and the edge member formation material in the edge member molding die so as to obtain a molded edge member. At this time, the outer edge portion of the substrate is located in a position separated a predetermined distance from the dividing line of the die.

3 Claims, 12 Drawing Sheets

PRIOR ART

PRIOR ART

PRIOR ART

100(100a)

METHOD OF MANUFACTURING SPEAKER EDGE MEMBER

BACKGROUND OF THE INVENTION

The present invention relates to a method of manufacturing a speaker edge member.

The present application claims priority from Japanese Application No. 2005-373232, the disclosure of which is incorporated herein by reference.

A speaker for reproducing music or the like has a general structure shown in FIGS. 1A, 1B, and FIG. 2 (disclosed in Japanese Unexamined Patent Application Publication No. 2003-111189). As shown, the conventional speaker has a magnetic circuit 1 formed by including a magnet 2, a lower plate 3, and an upper plate 4. An annular magnetic gap is formed between the upper plate 4 and a center pole 5 uprightly standing in the center of the lower plate 3. A coil bobbin 6 wound by a voice coil 7 is provided in a manner such that the voice coil 7 is located with in the magnetic gap. Further, the coil bobbin 6 is connected with one edge of a damper 11, while a damper support portion 11*a* supporting the other edge of the damper 11 is connected with a speaker frame 10, so that the voice coil 7 can be properly held within the magnetic gap of the magnetic circuit 1. Moreover, a center cap 8 is provided on an upper end of the coil bobbin 6, while a central portion of a diaphragm 20 is fixed near the upper end of the coil bobbin 6. In addition, an annular edge member 21 is connected to an outer edge portion of the diaphragm 20, so that the diaphragm 20 can be attached, by virtue of the annular edge member 21, to an upper portion of the speaker frame 10 mounted on the upper plate 4.

The annular edge member 21 is formed with an annular outer edge portion 21A which is used to attach the annular edge member 21 to an attachment surface 10*b* formed on an inner side of an edge portion 10*a* of the speaker frame 10. Such an outer edge portion 21A is integrally formed with the annular edge member 21 by virtue of pressurized molding using urethane or a rubber, has a desired thickness and faces inwardly. The bottom surface of the outer edge portion 21A is attached to the attachment surface 10*b* of the speaker frame 10, while its outer periphery surface 21*a* is attached to the inner side of the edge portion 10*a* of the speaker frame 10. FIG. 2 is a sectional view taken along B-B line shown in FIG. 1A. As shown in FIG. 2, an attachment screw 14 for attaching the speaker frame 10 to an attached member is provided on an inner attachment surface 10*b* inwardly of the edge portion 10*a* of the speaker frame 10. Here, the outer edge portion 21A has a thickness which is larger than that of the head of the attachment screw 14. Further, as shown in FIG. 1A and FIG. 2, a notch 21*b* is formed to avoid an undesired contact between the outer edge 21A and the attachment screw 14.

In fact, the annular edge member 21 is provided to resiliently support the outer edge portion of the speaker diaphragm 20 on the speaker frame 10. On the other hand, such an annular edge member 21 is required to have a holding function for holding the diaphragm 20 in a predetermined position, a linear displacement function (linearity) for linearly displacing the outer edge portion of the diaphragm with respect to a driving force acting on the diaphragm 20, a braking function for preventing a lateral vibration of the diaphragm 20, and an air tight function (air tightness) for preventing a back surface reflection sound wave from emitting to the front surface of the diaphragm. Further, since a vibration of the diaphragm will cause a vibration in the annular edge member 21 itself, it is important for the annular edge member 21 not to cause an inherent resonance. For this reason, a material and a shape of the annular edge member 21 are usually set in accordance with a performance required by each speaker, by taking into account the foregoing functions.

However, with regard to a high power high-output speaker such as sub-woofer, its diaphragm usually has a large vibration and thus there is a large negative pressure within a speaker cavity. As a result, an edge member, which should be kept in a convexly rolled shape, will become inwardly concave, undesirably causing a so-called "inward suction." When there is such an "inward suction," an edge shape designed for effecting a linear diaphragm displacement and preventing a lateral vibration and an inherent vibration of diaphragm, will get collapsed. At this time, the diaphragm 20 will cause an abnormal vibration and edge member itself will have an inherent resonance, resulting in a problem that a distorted or abnormal sound would occur in a low-pitched sound area.

On the other hand, Japanese Unexamined Patent Application Publication No. 2004-7357 has disclosed an edge member containing a substrate consisting of cloth, fiber or the like, with it rigidity improved to alleviate the above-mentioned problems. Specifically, this published patent application has disclosed a method in which an edge member 21 shown in FIG. 1 can be fabricated simply by virtue of insertion molding, which will be discussed as follows with reference to the accompanying drawings.

As shown in FIG. 3A, an edge member molding die 203 comprises a male die 203A, a female die 203B, as well as a core die 203C. At first, the male die 203A and the female die 203B are separated from each other. Then, edge member formation material 21A' serving as raw material for forming an edge member 21 is introduced into the female die 203B, a substrate 201B is placed over the edge member formation material 21A', and the core die 203C is interposed between the male die 203A and the female die 203B. Here, the substrate 201B is a member formed by impregnating a natural fiber with a thermosetting resin, followed by cutting the impregnated material into annular members.

Subsequently, as shown in FIG. 3B, the male die 203A and the female die 203B are closed towards each other and a heating/pressurizing treatment is carried out, thereby obtaining a speaker edge member 21' containing the substrate 201B.

However, when the above-mentioned insertion molding is performed, the substrate 210B will undesirably protrude beyond a parting line 204, as shown in FIGS. 3B and 3C, resulting in a low strength at the protruding portion and thus causing the edge member to be broken or suffer from some other troubles. Besides, after the foregoing insertion molding, it is necessary to carry out an additional step in which a cutter has to be used to cut off an unwanted substrate portion protruding beyond the parting line 204, thus requiring an additional time and an additional cost for carrying out such an additional step.

SUMMARY OF THE INVENTION

The present invention makes it one of its tasks to solve the above-discussed problem. Namely, it is an object of the present invention to improve a speaker edge member manufacturing process in which a substrate is introduced into an edge member formation material by virtue of insertion molding, to prevent a trouble such as a crack in a parting line or the like, thus shortening a manufacturing time and thus reducing a manufacturing cost.

In order to achieve the foregoing object, the present invention is characterized by at least the following aspects.

According to one aspect of the present invention, there is provided a method of manufacturing an annular speaker edge member in which an inner edge portion of the edge member is connected with a speaker diaphragm, an outer edge portion thereof is formed to face inwardly from an outer periphery of the edge member and is attached to an attachment surface of a speaker frame, while a generally edge member-shaped substrate is buried within an edge member formation material. In particular, an edge member molding die has at least a first die and a second die, as well as an annular cavity formed corresponding to a shape of the speaker edge member when the molding die is closed, while a dividing line is formed by virtue of dividing interfaces of the first die and the second die, along a circumferential direction of the annular cavity in a generally central portion of its outer periphery surface. The method comprises the steps of: attaching the substrate into the edge member molding die; introducing the edge member formation material into the edge member molding die before or after attaching the substrate into the edge member molding die; and applying a heating/pressurizing treatment to the substrate and the edge member formation material within the edge member molding die so as to obtain the edge member. Specifically, when the substrate is attached into the edge member molding die, the outer edge portion of the substrate is located in a position separated a predetermined distance from the dividing line of the die.

BRIEF DESCRIPTION OF THE DRAWINGS

These and other objects and advantages of the present invention will become clear from the following description with reference to the accompanying drawings, wherein:

FIG. 1 provides views showing a speaker.

FIG. 4 provides views showing a speaker formed according to a first embodiment of the present invention.

FIG. 6A shows a die which is in an opened state, FIG. 6B shows a die which is in a closed state, and FIG. 6C shows an edge member;

FIG. 7A shows a die which is in an opened state, FIG. 7B shows a die which is in a closed state, and FIG. 7C shows an edge member;

FIG. 8A is a sectional view taken along A-A line of the speaker 100*a* of the second embodiment shown in FIG. 4A, FIG. 8B is a sectional view taken along B-B line of the speaker 100*a* of the second embodiment shown in FIG. 4A;

FIG. 9 provides views showing a method of manufacturing an edge member 12*g* of the speaker 100*a* shown in FIGS. 8A and 8B.

FIG. 10 provide views showing a method of manufacturing an edge member 12*g* of the speaker 100*a* shown in FIGS. 8A and 8B.

FIG. 11 provides views showing a method of manufacturing a speaker edge member 12 to be provided near an attachment screw 14 shown in FIG. 8B, FIG. 12 provides views showing a speaker edge member according to a third embodiment of the present invention.

DETAILED DESCRIPTION OF THE PREFERRED EMBODIMENTS

In the speaker edge member manufacturing method according to one embodiment of the present invention, the inner edge portion of the edge member is connected to a speaker diaphragm, while an outer edge portion thereof is formed to face inwardly from the outer periphery surface of the edge member and attached to an attachment surface of the speaker frame, thereby obtaining an annular speaker edge member in which a generally edge member-shaped substrate has been buried within an edge member formation material. At this time, an edge member molding die has at least a first die and a second die, as well as an annular cavity formed corresponding to the speaker edge member within the die when the die is closed, while a dividing line is formed by virtue of the dividing surfaces of the first die and the second die, along a circumferential direction in a generally central portion within the annular cavity.

An edge member manufacturing method comprises the steps of: introducing the substrate into the edge member molding die; introducing the edge member formation material into the edge member molding die before or after introducing the substrate into the edge member molding die; heating/pressurizing the substrate and the edge member formation material in the edge member molding die so as to obtain an edge member. At this time, when the substrate is introduced into the edge member molding die, the outer edge portion of the substrate is located in a position separated a predetermined distance from the dividing line of the edge member molding die.

According to the foregoing manufacturing method, the outer edge portion of the substrate can be prevented from protruding beyond a parting line formed in a position corresponding to the dividing line between the first die and the second die, thereby preventing a crack in this portion of the edge member.

Further, since the substrate can be prevented from protruding beyond the parting line, it is not necessary to carryout an additional step which uses a cutter to cut off a protruding portion of the substrate after insertion molding, thereby making it possible to shorten a manufacturing time needed for the manufacturing process and thus reduce the manufacturing cost.

In the following, description will be given to explain the speaker edge member manufacturing method according to an embodiment of the present invention, with reference to the accompanying drawings.

First Embodiment

Figure 1A:
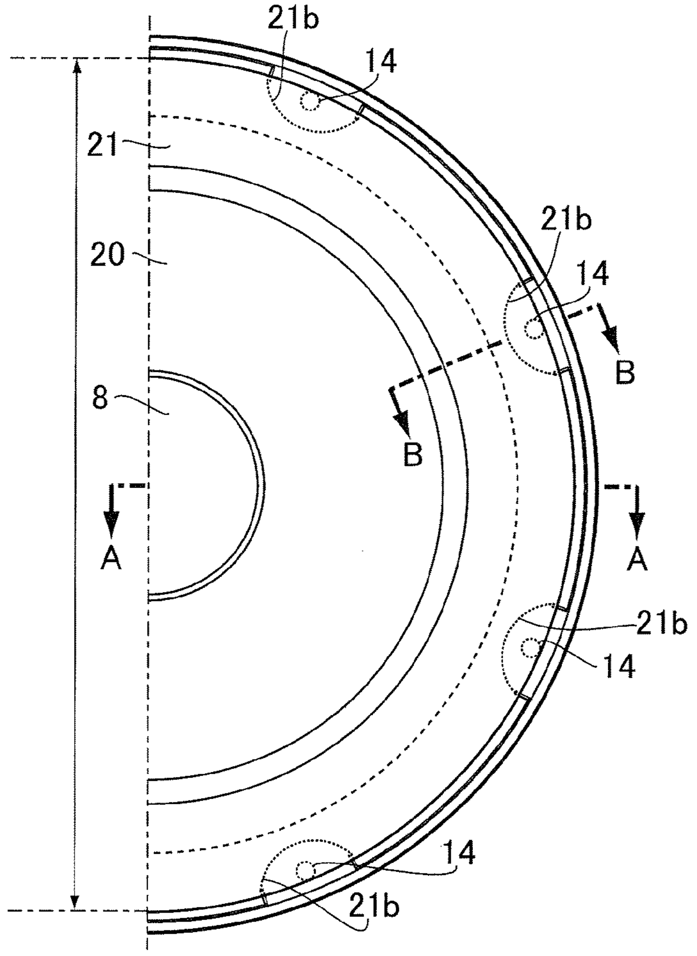
FIG. 1A is a front view of the speaker and FIG. 1B is a sectional view taken along A-A line of the speaker shown in FIG. 1A.
Figure 1B:
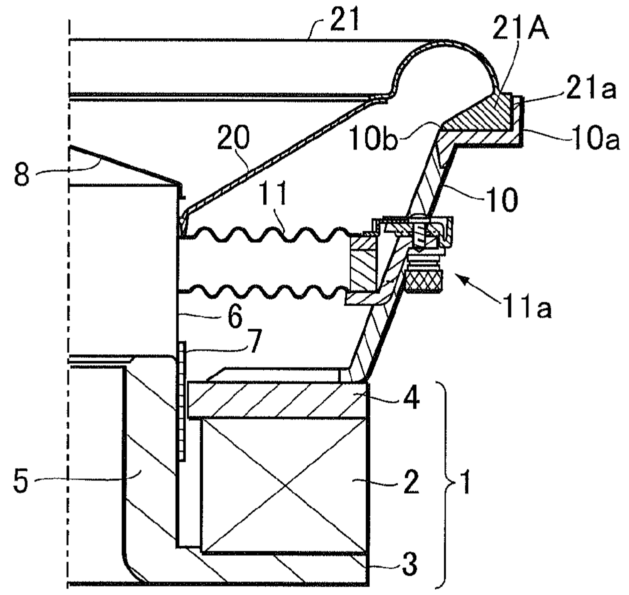
Figure 2:
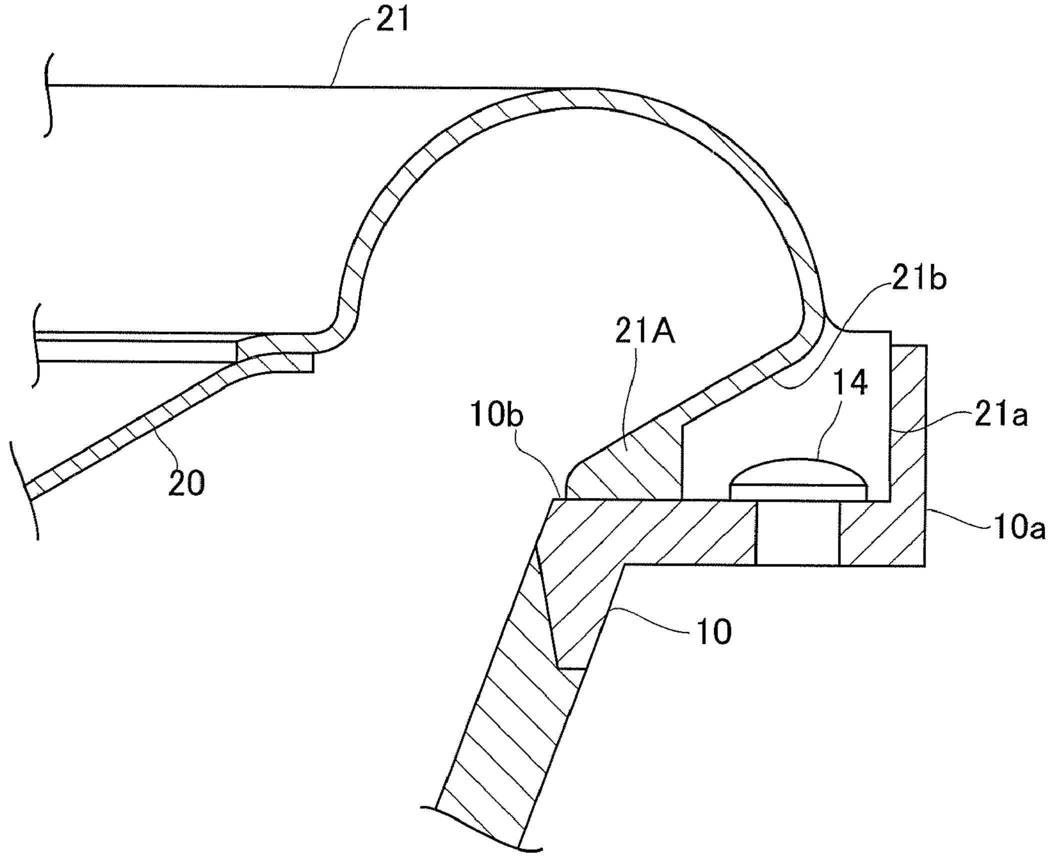
FIG. 2 is a sectional view taken along B-B line of the speaker shown in FIG. 1A.
Figure 3A:
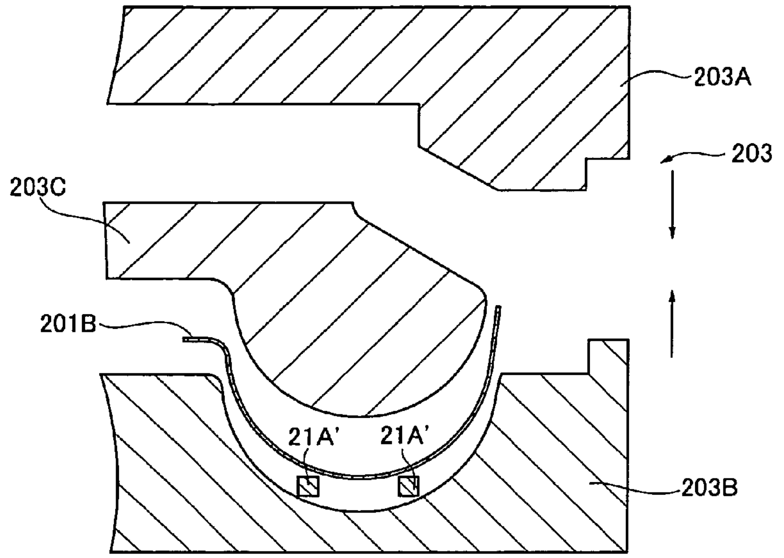
FIG. 3 provides views showing a method of manufacturing a speaker edge member using a conventional insertion molding.
Figure 3B:
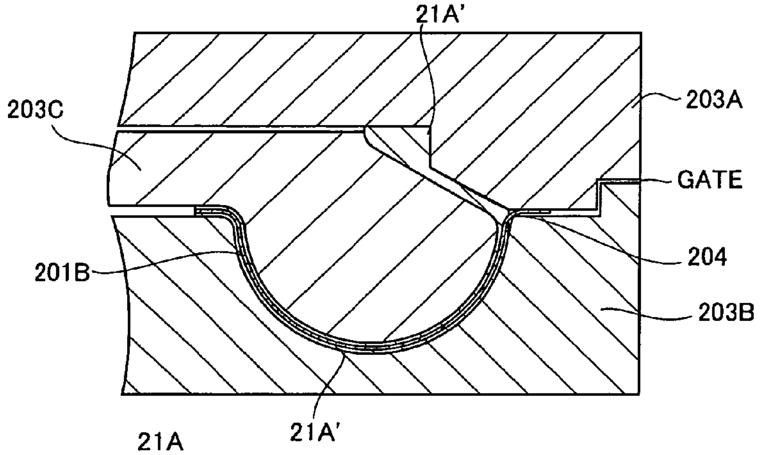
Figure 3C:
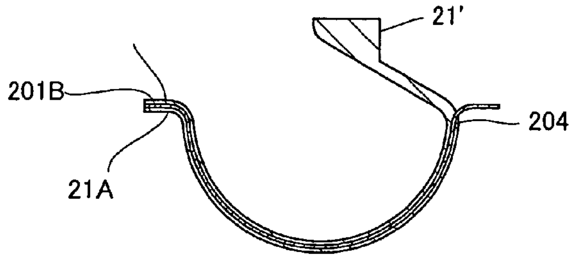
Figure 4A:
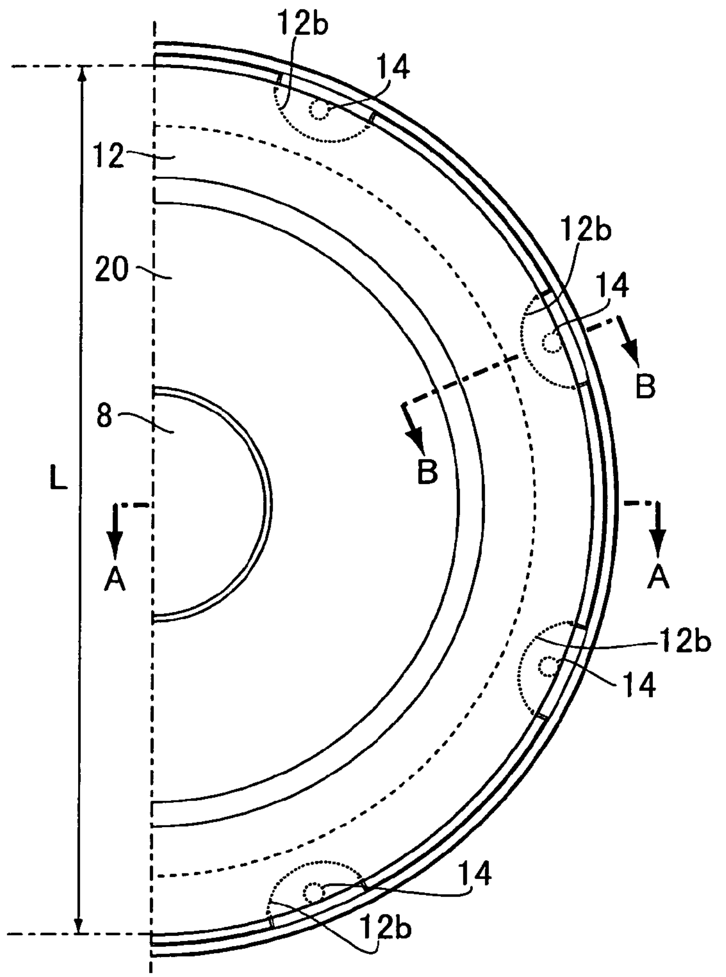
FIG. 4A is a plan view and FIG. 4B is a sectional view taken along A-A line shown in FIG. 4A.
Figure 4B:
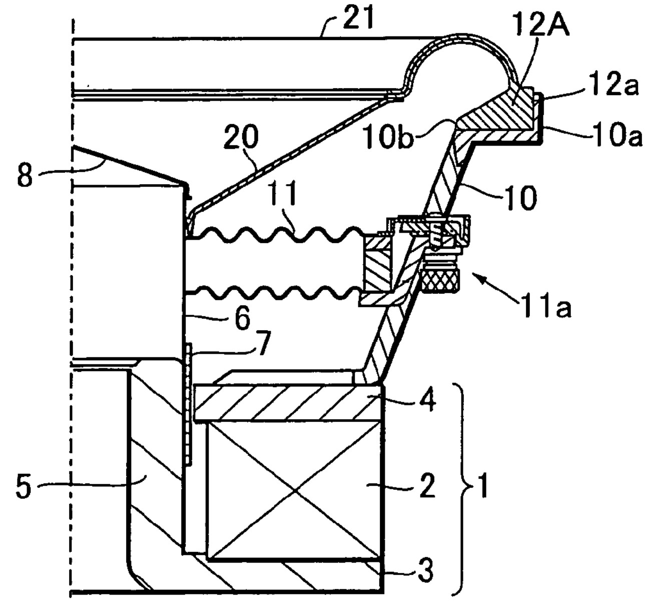
Figure 5A:
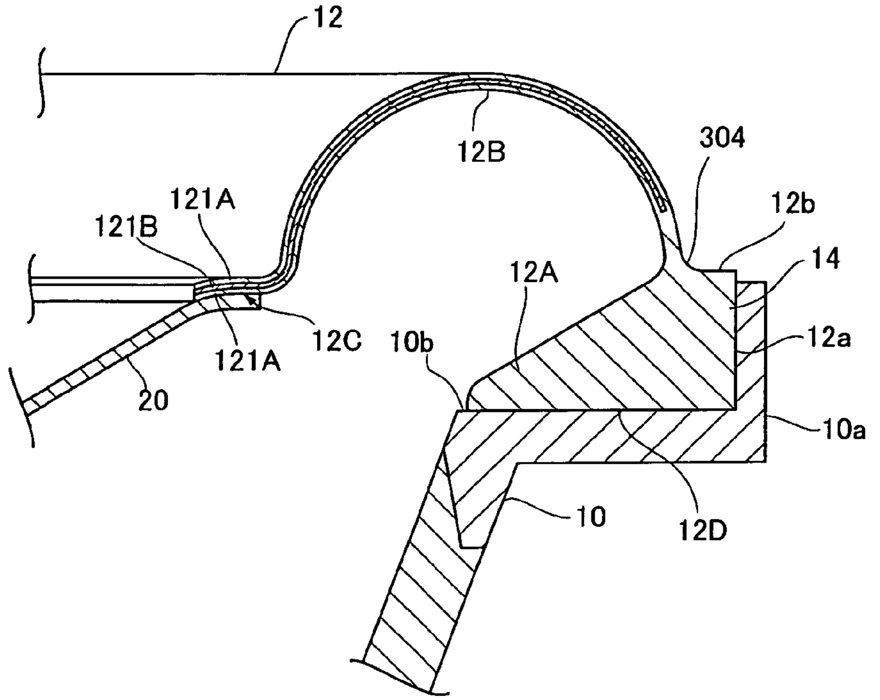
FIG. 5A is an enlarged view showing an area around the edge member shown in FIG. 4B.
Figure 5B:
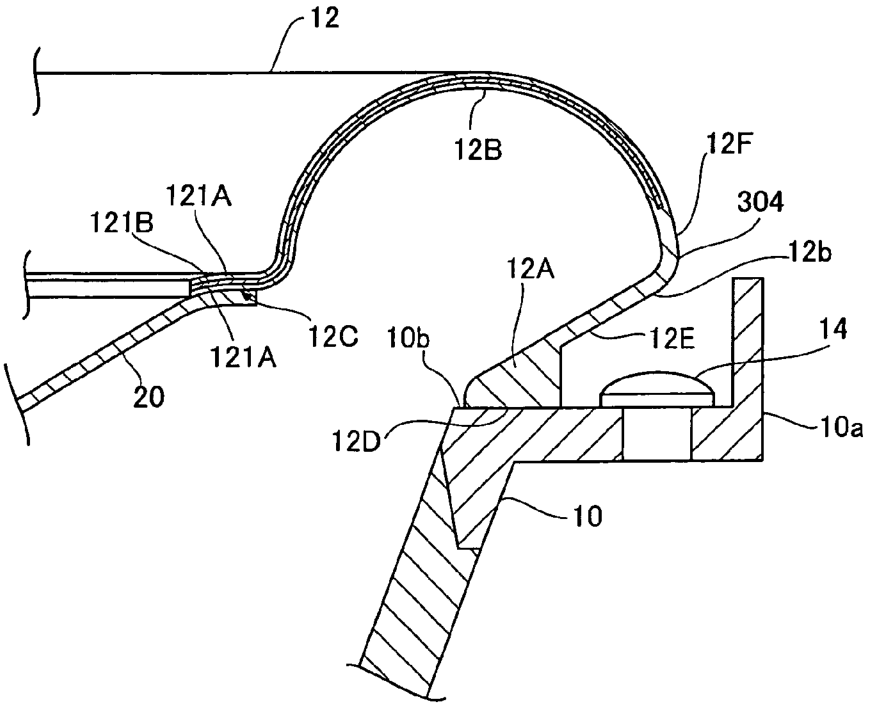
FIG. 5B is an enlarged sectional view taken along B-B line shown in FIG. 4A.

FIG. 4 provides views showing a speaker formed according to a first embodiment of the present invention. In more detail, FIG. 4A is a plan view and FIG. 4B is a sectional view taken along A-A line shown in FIG. 4A. FIG. 5A is an enlarged view showing an area around an edge member illustrated in FIG. 4B. FIG. 5B is a sectional view taken along B-B line shown in FIG. 4A. In the following description, the same structures and functions as those included in the speaker shown in FIG. 2 will be omitted.

As shown in FIGS. 4 and 5, a speaker 100 according to one embodiment of the preset invention is formed in a manner such that a central portion of a diaphragm 20 is fixed near an upper end of a coil bobbin 6, while an annular edge member 12 is connected with the outer edge portion of a diaphragm 20. The annular edge member 12 of the present embodiment includes an outer edge portion 12A, an arcade portion 12B, and an inner edge portion 12C. The outer edge portion 12A, the arcade portion 12B, and the inner edge portion 12C have been formed into an integral body.

The inner edge portion 12C is generally flat and connected with the outer edge portion of the diaphragm 20 on either its front or back surface. The arcade portion 12B is protruding in an upward direction. The outer edge portion 12A is formed on the outer edge of the annular edge member 12 and attached to an attachment surface 10*b* formed on the inner side of the outer edge portion 10*a* of the speaker frame 10. Such an outer edge portion 12A is formed of a predetermined material such as urethane or a rubber by virtue of pressurizing/molding. In practice, the outer edge portion 12A has a desired thickness and faces inwardly from the outer circumferential surface. Then, bottom. surface 12D is attached to the attachment surface 10*b* of the speaker frame 10, while its outer circumferential surface 12*a* is contacted with the inner side of an outer edge portion 10*a* of the speaker frame 10.

Moreover, as shown in FIG. 5B, an attachment screw 14 for attaching the speaker frame 10 in an attached member is provided on an inner attachment surface 10*b* inwardly of the outer edge portion 10*a* of the speaker frame 10. Here, the outer edge portion 12A has a thickness which is larger than that of the head of the attachment screw 14. Further, as shown in FIG. 4A and FIG. 5B, a notch 12*b* is formed to avoid an undesired contact between the outer edge portion 12A and the attachment screw 14. Here, such a notch 12*b* includes an inclined portion 12E which is connected with the arcade portion 12B through a bent portion 12F.

As shown in FIGS. 5A and 5B, the edge member 12 of the present embodiment contains a substrate 121B inserted in the edge formation material 121A.

Such an edge formation material 121A is formed by molding a rubber or the like, such as a synthetic rubber which may be a butyl rubber (IIR), a nitrile rubber (NBR), a styrene butadiene rubber (SBR), an ethylene propylene rubber (EPDM), a chloroprene rubber, an isoprene rubber, an ethylene propylene rubber, a norbornane rubber, a silicone rubber, or an epichlorohydrin rubber. Alternatively, it is also possible to use a rubber material containing at least one kind of natural rubber as its main component.

Here, the substrate 121B is formed by impregnating a cloth material consisting of a fiber such as cotton and an aramid fiber or the like with a thermosetting resin such as a phenol or the like, followed by performing a heating/pressurizing treatment so as to form a desired shape as an edge member.

Here, it is preferable to use a cloth material in which each weave texture has an hexagonal shape, thereby making it possible to obtain an annular edge member having an increased strength based on the foregoing structure.

Figure 6A:
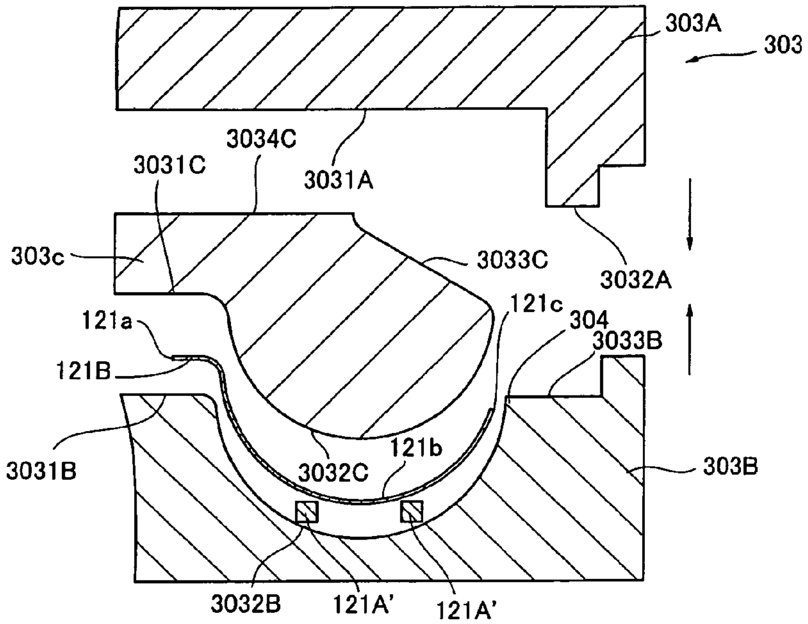
FIGS. 6A to 6C are views showing a method of manufacturing a speaker edge member 12 shown in FIGS. 4 and 5.
Figure 6B:
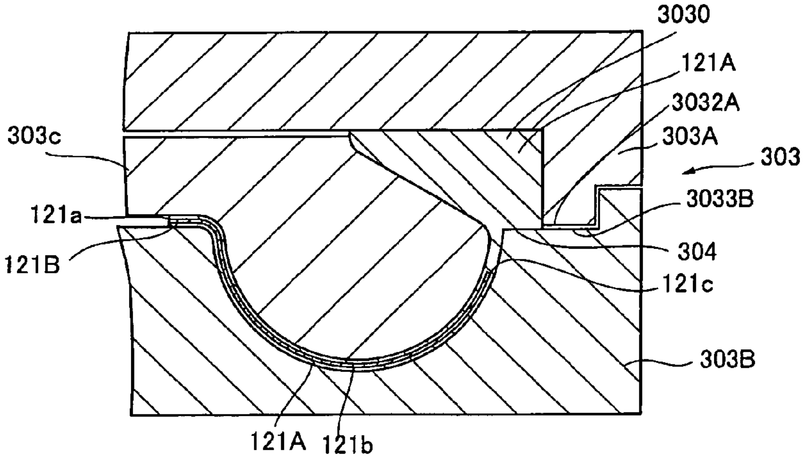
Figure 6C:
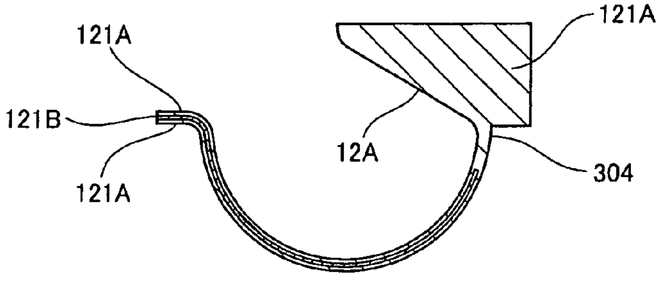
Figure 7A:
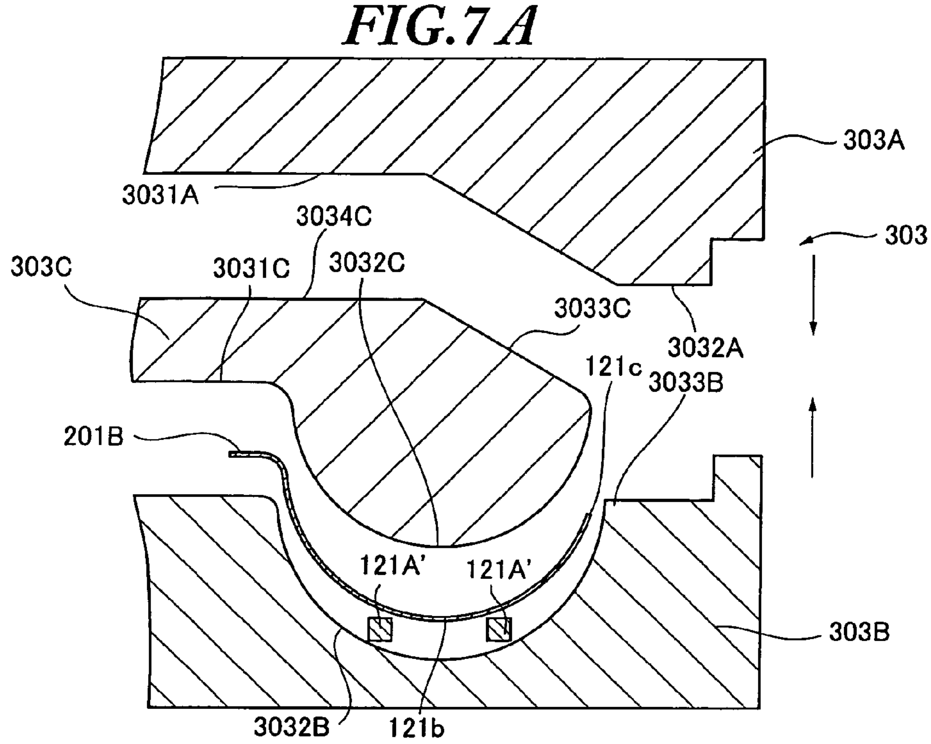
FIGS. 7A to 7C are views showing a method of manufacturing a speaker edge member 12 to be provided near an attachment screw 14 shown in FIG. 5B.
Figure 7B:
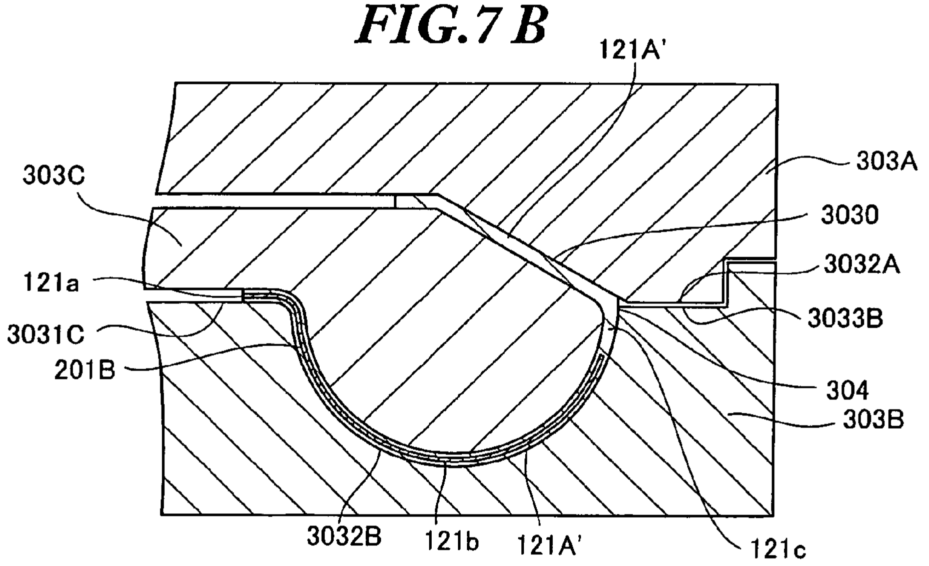
Figure 7C:
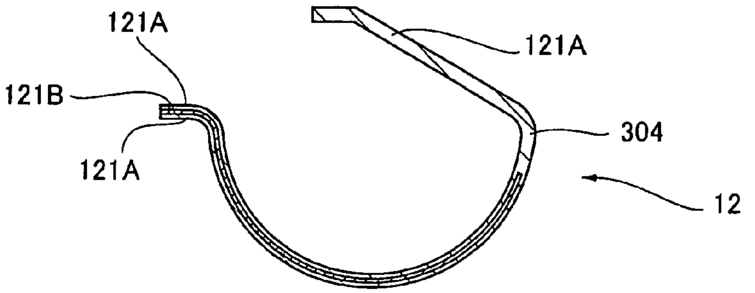

FIGS. 6A to 6C are views showing a process of manufacturing a speaker edge member 12 illustrated in FIGS. 4 and 5. FIGS. 7A to 7C are views showing a process of manufacturing a speaker edge member 12 which is to be provided near an attachment screw 14 illustrated in FIG. 5B. In the following, description will be given to explain a process of manufacturing the edge member 12 with reference to FIGS. 4 and 7. As shown in FIGS. 6 and 7, an edge member molding die 303 has a male die 303A, a female die 303B, and a core die 303C. In more detail, the edge member molding die 303 is an equivalent to the edge member molding die of the present invention. The male die 303A is an equivalent to a first die, the female die 303B is an equivalent to a second die, and the core die 303C is an equivalent to a third die.

The edge member molding die 303 is formed in a manner such that when the male die 303A and the female die 303B have been closed to each other, a cavity 3030 formed in a shape corresponding to the shape of the edge member will be located within the die 303. The core die 303C is a die to be disposed between the male die 303A and the female die 303B, and is positioned along the inner circumferential surface of the cavity 3030.

In the following, description will be given to explain various essential elements of the die 303 based on one embodiment of the present invention.

As shown in FIGS. 6A and 7A, the male die 303A has an inner flat surface 3031A and a dividing surface 3032A, while the female die 303B has an inner flat surface 3031B, a concave surface 3032B, and a dividing surface 3033B. Further, the core die 303C has a lower flat surface 3031C, a convex curved surface 3032C, an inclined surface 3033C, and an upper flat surface 3034C.

At this time, when the die 303 is closed, a dividing line of the die 303 will be formed by virtue of the dividing surfaces 3032A and 3033B of the male die 303A and the female die 303B. Further, such dividing line is formed along a circumferential direction in a generally central portion within the annular cavity 3033.

At first, an edge member-shaped substrate 121B is formed. In more detail, a cloth material consisting of fiber is impregnated with a thermosetting resin. Then, a heating/pressurizing treatment is performed using a die molding apparatus, thereby forming a predetermined edge member-shaped substrate 121B. As shown in FIGS. 5 to 7, the substrate 121B has a flat portion 121*a*, and an arcade portion 121*b* having an arc-like section.

Next, as shown in FIGS. 6A and 7A, the substrate 121B is introduced into an edge member molding die 303. Before or after this step, the edge member formation material 121A' is introduced into the edge member molding die 303. In more detail, according to the present embodiment, the male die 303A and the female die 303B are at first separated from each other. Then, the edge member formation material 121A' serving as a raw material for forming the edge member 12 is introduced into a concave portion 3032B of the female die 303B. In fact, such an edge member formation material 121A' can also be formed into an annular member or a rod-shaped member.

Then, the substrate 121B is disposed over the edge member formation material 121A'. At this time, an outer edge portion 121*c* of the substrate 121 is disposed at a position separated a predetermined distance from the dividing line, in a manner such that the outer edge portion 121*c* of the substrate 121 will not extend beyond surfaces 3032A and 3033B (corresponding to the dividing line) of the male die 303A and the female die 303B. Here, in the present embodiment, the substrate 121B is disposed in a manner such that the outer edge portion 121*c* of the substrate 121 will be put at a position which is lower than the dividing line. In this way, disposing the substrate 121B in the above-described manner makes it possible to prevent the outer edge portion 121*c* of the substrate 121 from protruding beyond the parting line 304.

Next, the core die 303C is disposed between the substrate 121B held within the female die 303B on one hand and the male die 303A on the other. At this time, the curved surface 3032C of the core die 303C is arranged to face the concave portion 3032B of the female die 303B. Then, the male die 303A is disposed over the core die 303C.

Subsequently, the die 303 is closed and tightened, while the substrate 121B and the edge member formation material 121A' are subjected to a heating/pressurizing treatment within the edge member molding die 303. In more detail, a die tightening apparatus having a die tightening cylinder drives the die tightening cylinder to have the male die 303A and the female die 303B closed together and tightened up, thereby effecting the heating/pressurizing treatment. As shown in FIGS. 6B and FIG. 7B, the heating/pressurizing treatment will cause the edge member formation material 121A' to be liquefied within the die 303 and thus fill the cavity. After a predetermined time, when the edge member formation material 121A' is solidified, the die tightening apparatus drives the die tightening cylinder to separate the male die 303A and the female die 303B from each other so as to open the die 303. In this way, as shown in FIG. 6C and FIG. 7C, a molded edge member 12 can be taken out of the die 303, thereby obtaining a desired speaker edge member 12.

As described above, the method of the present invention comprises a step of attaching an edge member-shaped substrate into an edge member molding die, a step of introducing edge member formation material into the edge member molding die (which step may be carried out before or after the step of attaching an edge member-shaped substrate into an edge member molding die), and a step of heating/pressurizing the substrate and the edge member formation material within the edge member molding die. In the step of attaching an edge member-shaped substrate into an edge member molding die, since an insertion molding is carried out under a condition in which the outer edge portion of the substrate is disposed at a position separated a predetermined distance from the dividing line between the male die 303A and the female die 303B, it is possible to prevent a trouble such as crack on the parting line 304.

Moreover, in the method of manufacturing the edge member 12 by means of insertion molding, since the outer edge portion of the substrate can be prevented from protruding beyond the parting line between the male die and the female die, it is possible to prevent a crack in this portion.

Further, as shown in FIGS. 7A to 7C, in the method of manufacturing the edge member 12, since the substrate 121B will not extend beyond the parting line 304 near the attachment screw 14, it is possible to prevent a trouble such as crack on the parting line 304, thereby avoiding a decreased strength of the edge member.

For example, since the substrate 121B will not extend beyond the parting line, it is not necessary to carry out an additional step to cut off a protruding portion of the substrate after the insertion molding, thereby simplifying the manufacturing process, shortening the manufacturing time, and thus reducing the manufacturing cost.

Second Embodiment

Figure 8A:
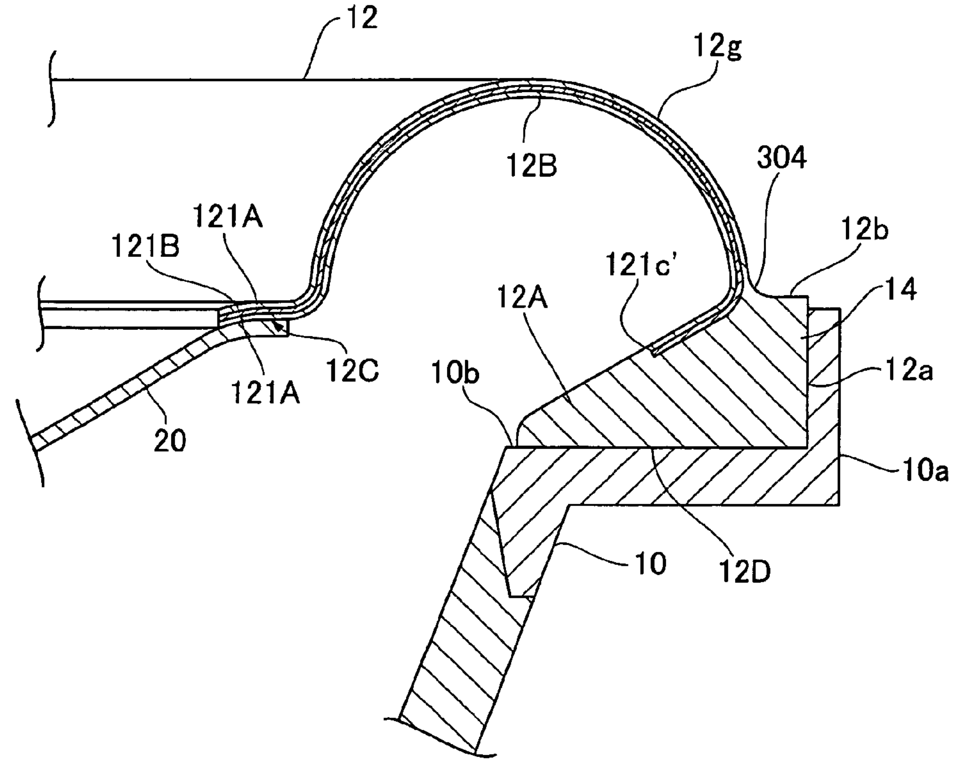
FIGS. 8A and 8B are sectional views showing an edge member of a speaker 10*a* formed according to a second embodiment of the present invention.
Figure 8B:
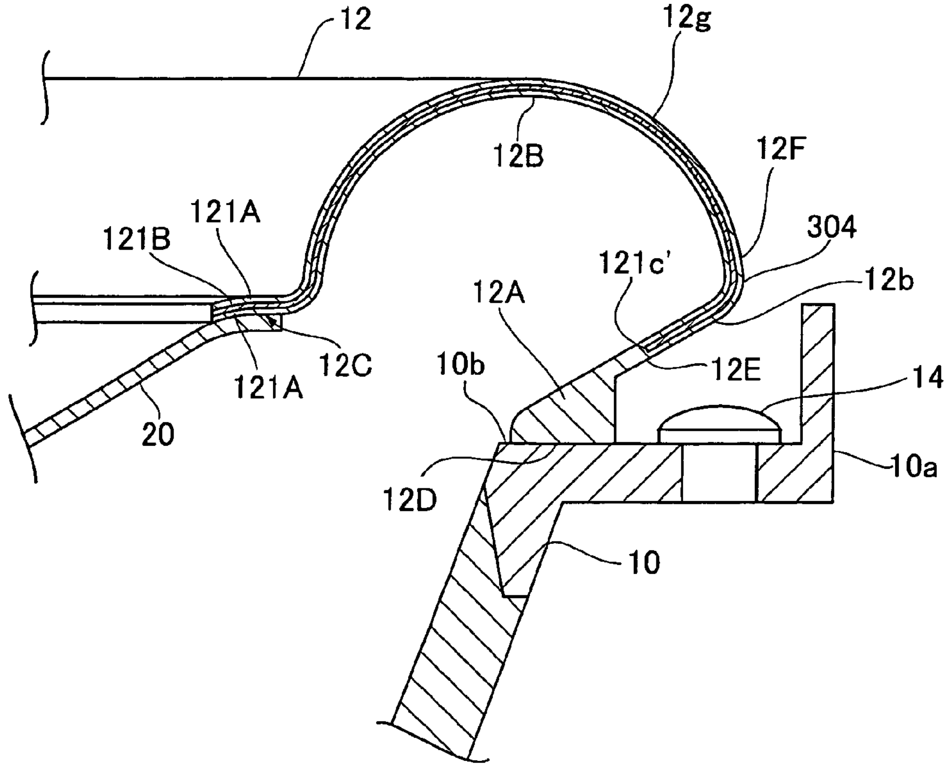

FIGS. 8A and 8B are sectional views showing a speaker edge member formed according to a second embodiment of the present invention. However, the following description will not explain structure and function which are substantially the same as those of the first embodiment. In more detail, FIG. 8 is a sectional view taken along A-A line of the speaker 10Oa shown in FIG. 4A, FIG. 8B is a sectional view taken along B-B line of the speaker 100*a* shown in FIG. 4A.

As shown in FIGS. 8A and 8B, an edge member 12*g* of the present embodiment is formed such that an outer edge portion 121*c*' of a substrate 121B' is located at an outer edge portion 12A of the edge member 12*b*, inwardly of the parting line 304 formed along a circumferential direction over the outer surface of the bent portion of the edge member 12*g*.

With regard to the edge member 12*g* having the above-described structure, since the outer edge portion 121*c*' of the substrate 121B' buried within the edge member formation material 121A is located in an outer edge portion 12A of the edge member 12*g* inwardly of the parting line 304, such an edge member 12*g* has a higher strength than that of the edge member of the first embodiment.

Figure 9A:
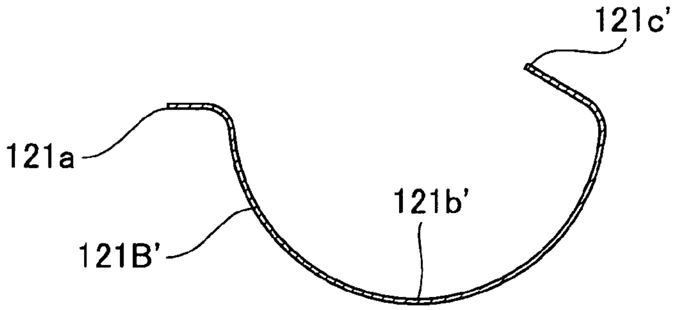
FIG. 9A is a view showing a substrate.
Figure 9B:
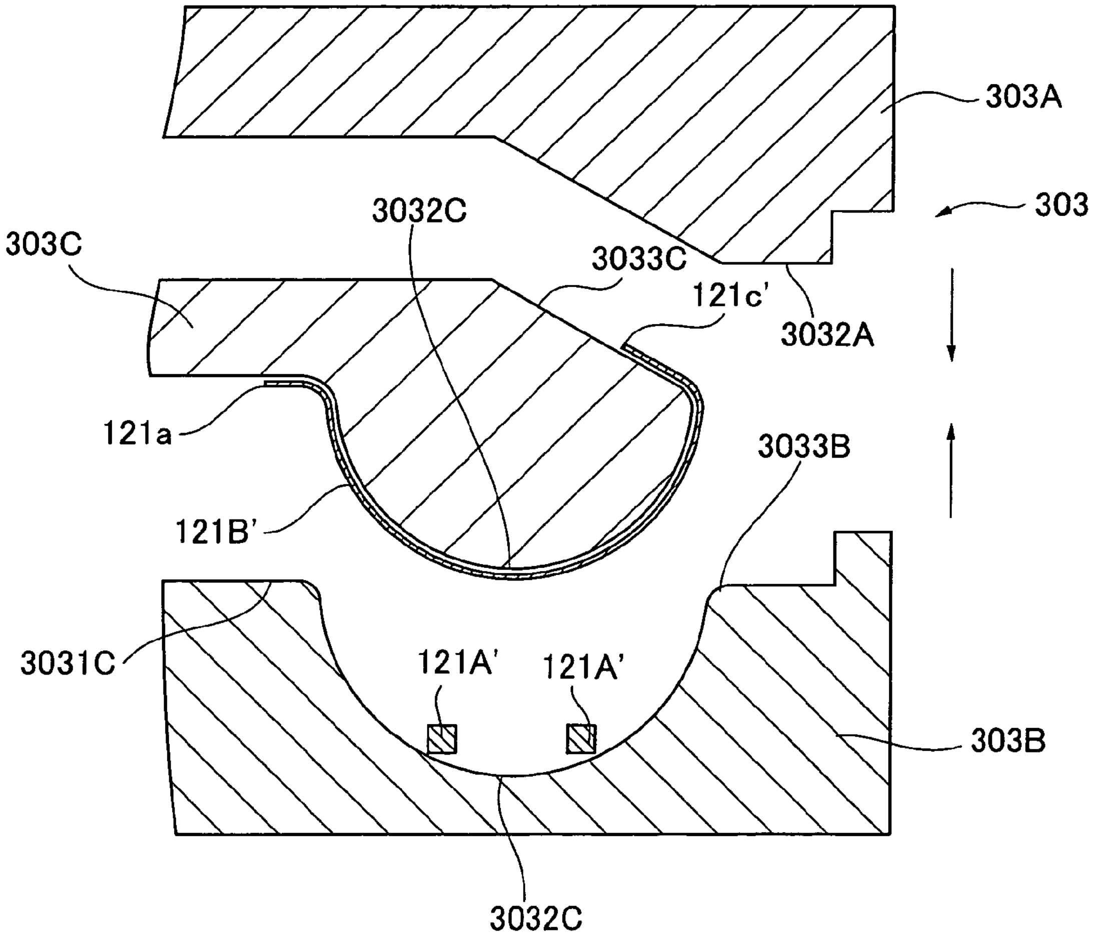
FIG. 9B is a view showing that the substrate is being introduced into a die.

FIG. 9 provides explanatory views showing a method of manufacturing the edge member 12*g* of the speaker 100*a* shown in FIGS. 8A and 8B. FIG. 10 provides explanatory views showing another method of manufacturing the edge member 12*g* of the speaker 100*a* shown in FIGS. 8A and 8B. FIG. 11 provides explanatory views showing a method of manufacturing the edge member 12*g* which is to be positioned near an attachment screw 14 shown in FIG. 8B. In the following, description will be given to explain a method of manufacturing the speaker edge member 12*g* according to the present embodiment with reference to FIGS. 9A to 9C, but will not explain structure, function, and operation which are substantially the same as those of the foregoing embodiments.

At first, as shown in FIG. 9A, the substrate 121B' is formed in a shape similar to an annular edge member. In more detail, a cloth material consisting of fiber or the like is impregnated with a thermosetting resin, followed by a heating/pressurizing treatment in a die molding apparatus, thereby obtaining a desired substrate 121B' having a predetermined annular edge shape. At this time, as shown in FIGS. 8 and 9, the substrate 121B' has a flat portion 121*a* formed on an inner circumferential side, and an arcade portion 121*b*' having an arc-like section protruding from the flat portion 121*a*. As shown in FIG. 9B, the arcade portion 121*b*' is formed to have a bent portion which is longer than that formed in the first embodiment, while the outer edge portion 121*c*' of the substrate 121B' is bent more inwardly than in the first embodiment.

Next, as shown in FIG. 9B, the substrate 121B' is placed in the die 303 in a manner such that the inner edge portion of the substrate 121B' is positioned between the female die 303B and the core die 303C, while the outer edge portion of the substrate 121B' is positioned between the male die 303A and the core die 303C. In more detail, the outer edge portion of the substrate 121B' is disposed in the cavity 3030C at an upper side higher than the dividing surfaces 3032A and 3033B (corresponding to the dividing line). Further, the substrate 121B' is disposed along the side face (corresponding to the curved surface 3032C and the inclined surface 3033C) of the core die 303C.

In detail, the outer edge portion 121*c*' of the substrate 121B' is located in a position separated a predetermined distance from the dividing surfaces 3032A and 3033B of the male die 303A and the female die 303B. In more detail, the inner surface of the curved portion 3032C of the substrate 121B' is arranged to face the curved surface of the core die 303C, while the outer edge portion 121*c*' is positioned on the inclined surface 3033C.

Figure 10A:
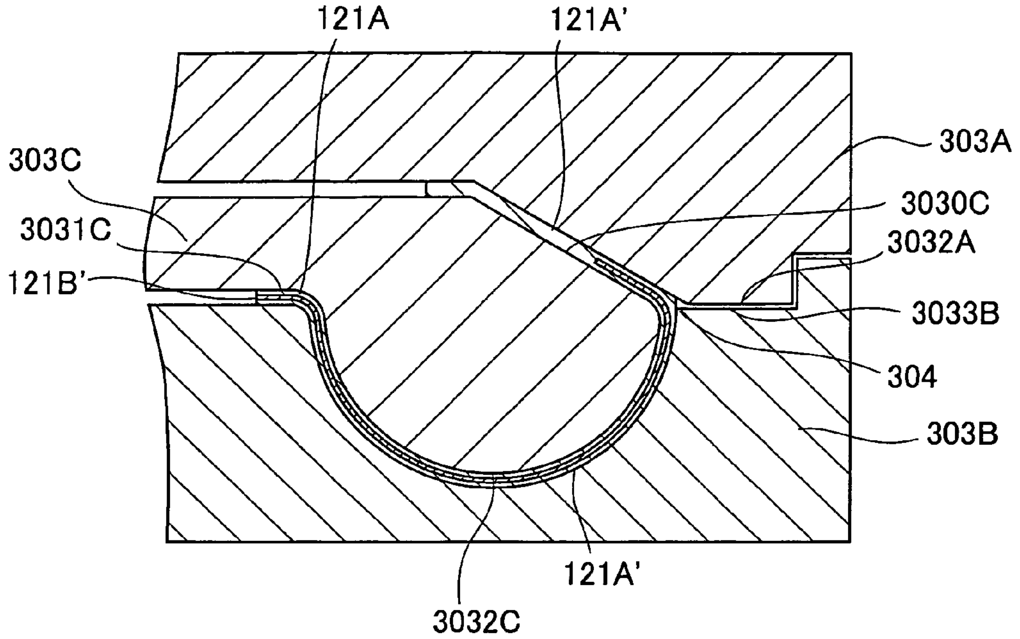
FIG. 10A is a view showing a die which is in a closed state.
Figure 10B:
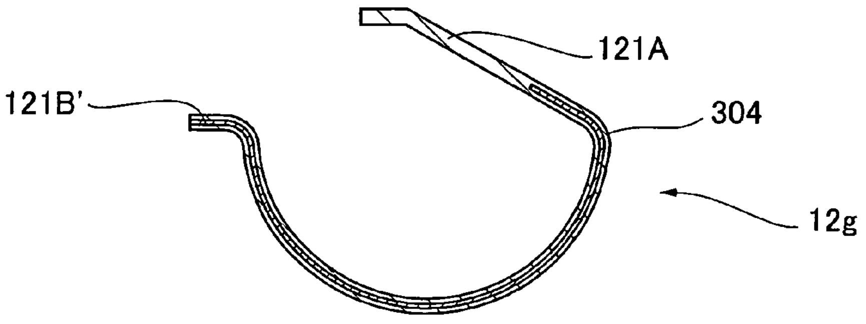
FIG. 10B is a view showing an edge member.
Figure 11A:
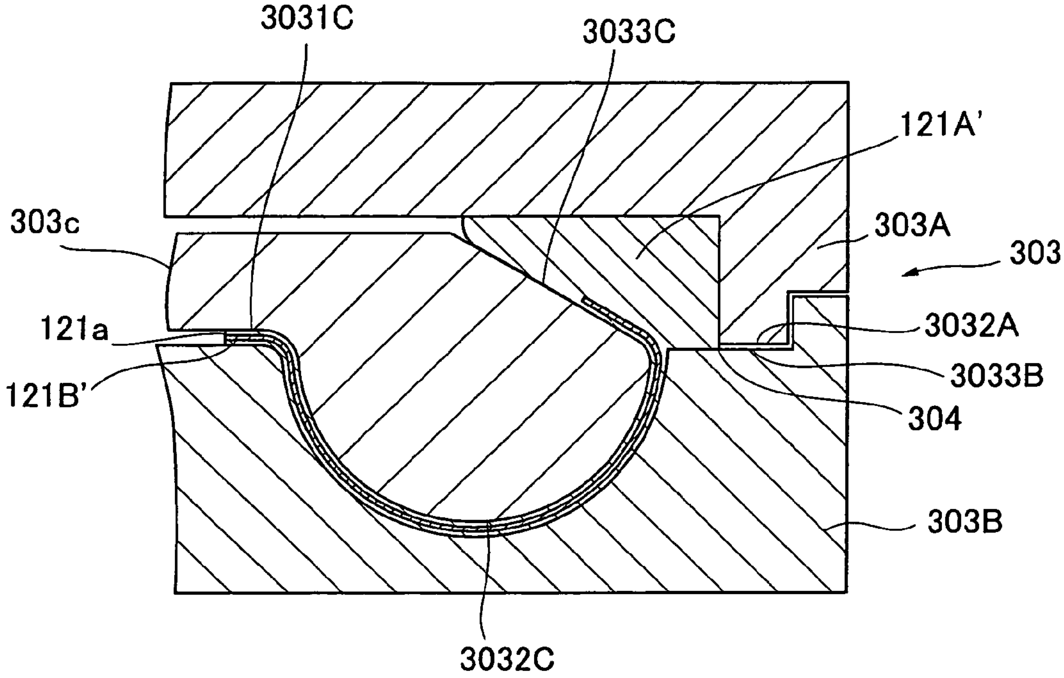
FIG. 11A is a view showing a die which is in a closed state.
Figure 11B:
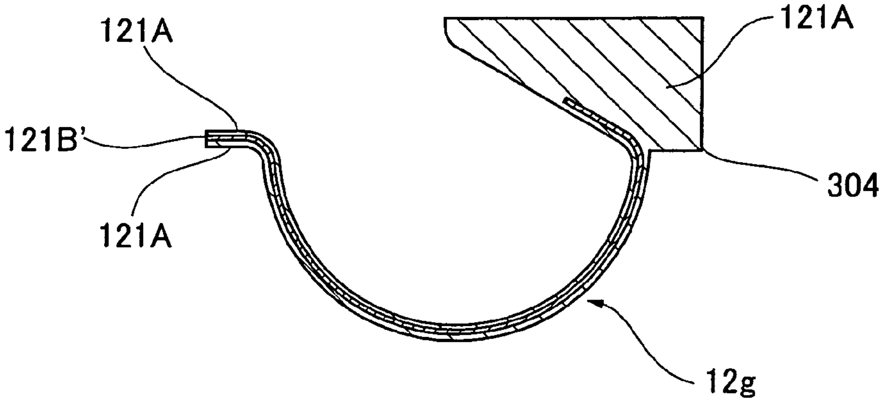
FIG. 11B is a view showing an edge member.

Next, as shown in FIGS. 10A and 11A, the die 303 is closed and tightened up so that the substrate 121B' and the edge member formation material 121A' are subjected to a heating/pressurizing treatment within the edge member molding die 303. In more detail, a die tightening apparatus (not shown) having a tightening cylinder drives the tightening cylinder so that the male die 303A and the female die 303B are closed together and tightened up, thereby carrying out the heating/pressurizing treatment. Then, as shown in FIG. 10A and FIG. 11A, the edge member formation material 121A' is liquefied due to the heating/pressurizing treatment within the die 303 so that the cavity is filled with the liquefied material. After a predetermined time, when the edge member formation material 121A' is solidified, the die tightening apparatus drives the die tightening cylinder to separate the male die 303A and the female die 303B from each other so as to open the die 303. In this way, as shown in FIG. 10B and FIG. 11B, a molded edge member 12*g* can be taken out of the die 303.

In the present embodiment described above, since the substrate 121B' is disposed in a manner such that the inner surface of the curved portion 3032C of the substrate 121B' will face the curved surface of the core die 303C and the outer edge portion 121*c*' will be positioned on the inclined surface 3033C, it is possible to prevent the outer edge portion 121c' of the substrate 121B' from protruding beyond the parting line 304 corresponding to the dividing surfaces of the male die 303A and the female die 303B during the heating/pressurizing treatment. Further, the edge member 12*g* which is a molded member is so formed that it is possible to prevent the outer edge portion 121*c*' of the substrate 121B' from protruding from the parting line 304 corresponding to the die dividing line between the male die 303A and the female die 303A, thereby preventing a decrease in the strength of the annular edge member.

Third Embodiment

Figure 12A:
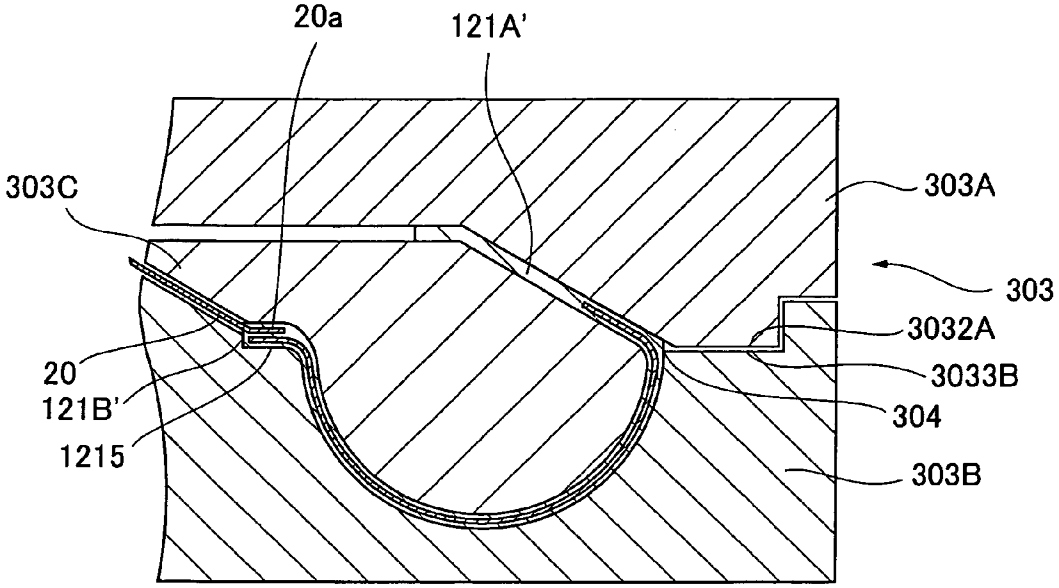
FIG. 12A is a view showing a method of manufacturing a speaker edge member.
Figure 12B:
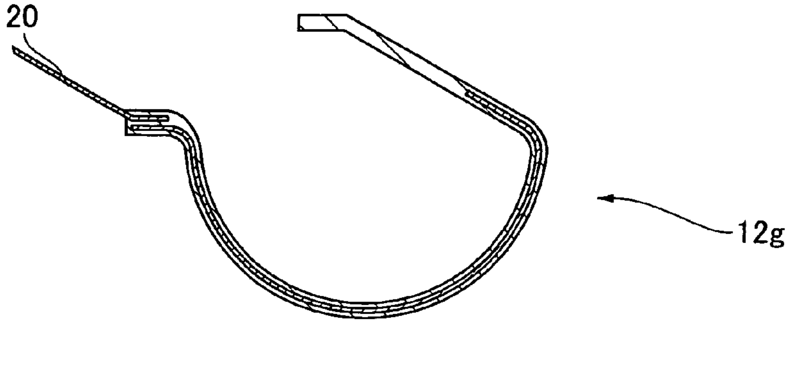
FIG. 12B is a view showing a speaker edge member manufactured by the manufacturing method shown in FIG. 12A.

FIG. 12 provides views showing a speaker edge member formed according to a third embodiment of the present invention. In detail, FIG. 12A is a view showing a method of manufacturing a speaker edge member, and FIG. 12B is a view showing a speaker edge member manufactured in the speaker edge member manufacturing method shown in FIG. 12A.

In the speaker edge member manufacturing method according to the present embodiment, the inner circumferential side of the speaker edge member and the outer circumferential side of the speaker diaphragm are integrally formed together by virtue of an edge member formation material such as resin or the like. However, in the following description, the structure, function, and operation or the like which are substantially the same as foregoing embodiments will be omitted. At first, as shown in FIG. 12A, the diaphragm 20 and the edge member formation material 121A' are placed in the die 303. In more detail, the outer edge portion 20*a* of the diaphragm 20 and the inner edge portion 1215 of the edge member formation material 121A' are arranged one above another. At this time, the diaphragm 20 and the edge member formation material 121A' can be properly set in an upper/down relation. In this way, it is possible to obtain an edge member 12*g* of the present embodiment in a manner shown in FIG. 12B by performing a heating/pressurizing treatment.

As described above, according to the speaker edge member manufacturing method of the present embodiment, since the speaker edge member and the outer edge portion of the speaker diaphragm can be integrally formed together, it is possible to omit an adhesion step for connecting together the speaker edge member and the speaker diaphragm, thereby shortening a manufacturing time.

However, the present invention should not be limited to the above-described embodiments. For example, it is possible to combine several of the embodiments of the present invention.

Besides, although the foregoing embodiments have described a speaker edge member having an arc-like section, this should not form any limitation to the present invention. In fact, the present invention can also be applied to a speaker edge member having an inverted V-shaped section or a wave-shaped section.

In addition, although the foregoing embodiments have described a speaker edge member to be connected to the cone-shaped diaphragm 20, this should not form any limitation to the present invention. Actually, it is also possible for the present invention to be applied to an edge member to be connected to a dome diaphragm or a flat diaphragm.

As described above, the edge member molding die 303 has at least the male die 303A and the female die 303B, as well as an annular cavity 3030 formed corresponding to the speaker edge member 12 within the die 303 when the die 303 is closed, while a dividing line is formed by virtue of the dividing surfaces of the male die 303A and the female die 303B, along a circumferential direction in a generally central portion of the annular cavity. The edge member manufacturing method comprises the steps of: attaching the substrate 121B into the edge member molding die 303; introducing the edge member formation material 121A into the edge member molding die 303 before or after attaching the substrate 121B into the edge member molding die 303; heating/pressurizing the substrate 121B and the edge member formation material 121A in the edge member molding die 303 so as to obtain an edge member. At this time, when the substrate 121B is attached into the edge member molding die 303, the outer edge portion of the substrate 121B is located in a position separated a predetermined distance from the dividing line of the die 303. In this way, the inner edge portion of the substrate 121B can be connected to a speaker diaphragm, while the outer edge portion of the substrate 121B can face inwardly from the outer periphery surface of the edge member and be attached to an attachment surface of the speaker frame, thereby obtaining an annular edge member 12 in which the generally edge member-shaped substrate 121B has been buried within the edge member formation material.

In this way, it is possible to prevent a trouble such as a crack in the parting line of the edge member 12, which parting line is formed corresponding to the dividing line of the die. Further, the outer edge portion of the substrate 121B can be prevented from protruding beyond the dividing line between the male die 303A and the female die 303B, thereby preventing a crack in this portion of the edge member. Further, since the substrate 121B can be prevented from protruding beyond the dividing line, it is not necessary to carry out an additional step which uses a cutter to cut off a protruding portion of the substrate after insertion molding, thereby making it possible to shorten a manufacturing time needed for the manufacturing process and thus reduce the manufacturing cost.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method of manufacturing an annular speaker edge member in which an inner edge portion of the edge member is connected with a speaker diaphragm, an outer edge portion thereof, which becomes gradually smaller in thickness from an outer side, is formed to face inwardly from an outer periphery of the edge member and is attached to an attachment surface formed on an inner side of an outer periphery edge of a speaker frame, wherein an outer periphery surface of said outer edge portion projects outwardly beyond said outer periphery of the edge member and engages with the outer periphery edge of the speaker frame, wherein a generally edge member-shaped substrate is buried within an edge member formation material, wherein an edge member molding die has at least a first die, a second die, and a third die, as well as an annular cavity formed corresponding to a shape of the speaker edge member when the molding die is closed, while a dividing line is formed by virtue of dividing interfaces of the first die and the second die, along a circumferential direction of the annular cavity in a generally central portion of its outer periphery surface, wherein the third die is positioned on an inner side of said cavity, said method comprises the steps of:

attaching said substrate into said edge member molding die;

introducing the edge member formation material into said edge member molding die before or after attaching said substrate into said edge member molding die; and applying a heating/pressurizing treatment to said substrate and said edge member formation material within the edge member molding die so as to form said edge member, wherein said substrate is disposed within the edge member molding die in a manner such that an inner edge portion of the substrate is located between the second die and the third die, while an outer edge portion of the substrate is located between the first die and the third die, the outer edge portion of the substrate being in a position which is higher than said dividing line within said cavity.

2. The method according to claim 1, wherein said substrate is disposed on side face of said third die.

3. The method according to claim 1, wherein when the speaker edge member is molded, such an edge member and an outer edge portion of the speaker diaphragm are integrally formed together by virtue of the edge member formation material.

* * * * *